Nov. 17, 1931.  J. BORNSTEIN  1,832,085
WIPER MECHANISM FOR WINDSHIELDS AND THE LIKE
Filed Nov. 6, 1929  7 Sheets-Sheet 3

Inventor:
Joseph Bornstein
by Arthur F. Randall
atty.

Nov. 17, 1931.  J. BORNSTEIN  1,832,085
WIPER MECHANISM FOR WINDSHIELDS AND THE LIKE
Filed Nov. 6, 1929  7 Sheets-Sheet 6

Fig. 7.

Patented Nov. 17, 1931

1,832,085

UNITED STATES PATENT OFFICE

JOSEPH BORNSTEIN, OF DORCHESTER, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed November 6, 1929. Serial No. 405,175.

My invention relates to wiper mechanisms for windshields and the like of that class in which the wiper element is reciprocated back and forth across the front side of the windshield, and it has for its object to improve the construction and operation of wiper mechanisms of this class One type of wiper mechanism of the class referred to included an endless chain or belt that was continuously driven in one direction to reciprocate the wiper element and an objection to this type of mechanism was that in time the chain or belt would stretch with the result that the device would become noisy in its operation and the parts thereof would be subjected to undue wear.

Another type of wiper mechanism of the class described included a pair of worm shafts disposed side by side that operated alternately to actuate the wiper in opposite directions, the wiper carriage being provided, between the two worm shafts, with a connector mechanism that was automatically operated at the end of each stroke of the wiper element to disconnect the same from one worm shaft and connect it with the other. This type of mechanism required complicated, expensive and noisily operating mechanism including the shiftable connector referred to, which was objectionable.

Heretofore, also, wiper mechanisms have been constructed with wiper actuating mechanism including a shiftable clutch member, gear, or motor reversing switch, that was automatically controlled by the movements of the wiper element or its carriage so as to reverse the direction of movement of the wiper carriage at the end of each stroke thereof. In most cases with which I am familiar these constructions have been characterized by the fact that it was possible for the shiftable clutch member, gear or motor reversing switch, to stick or dwell in an intermediate inoperative position thus rendering the device as a whole inoperative My invention obviates these objectionable features and provides a compact, efficient and inexpensive windshield wiper mechanism having the peculiar features of construction and mode of operation hereinafter set forth in the following description, the several novel features of the invention being particularly pointed out and defined in the claims at the close thereof.

Figure 1:
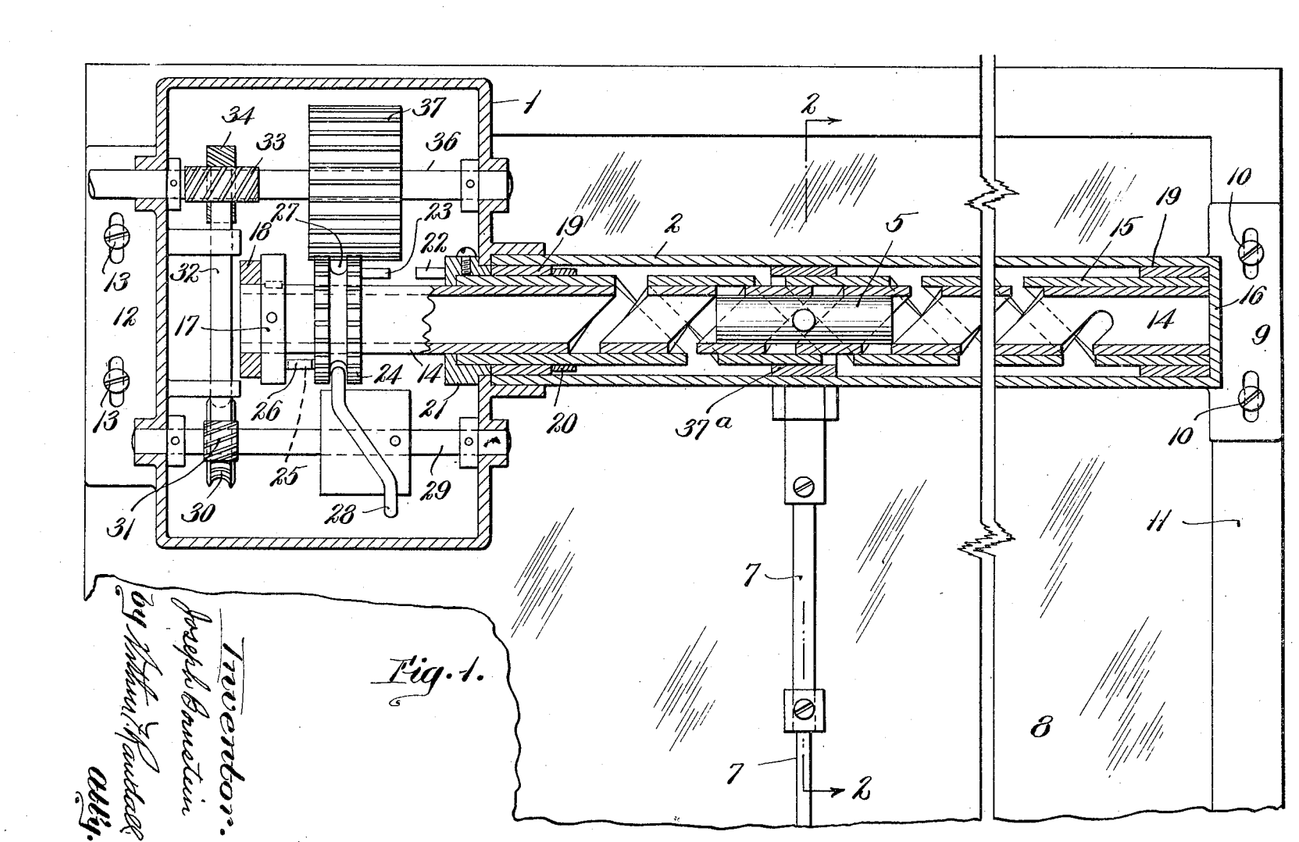
Figure 1 is a partial front elevation of a windshield equipped with a wiper mechanism embodying one form of my invention.
Figures 2, 6, 8:
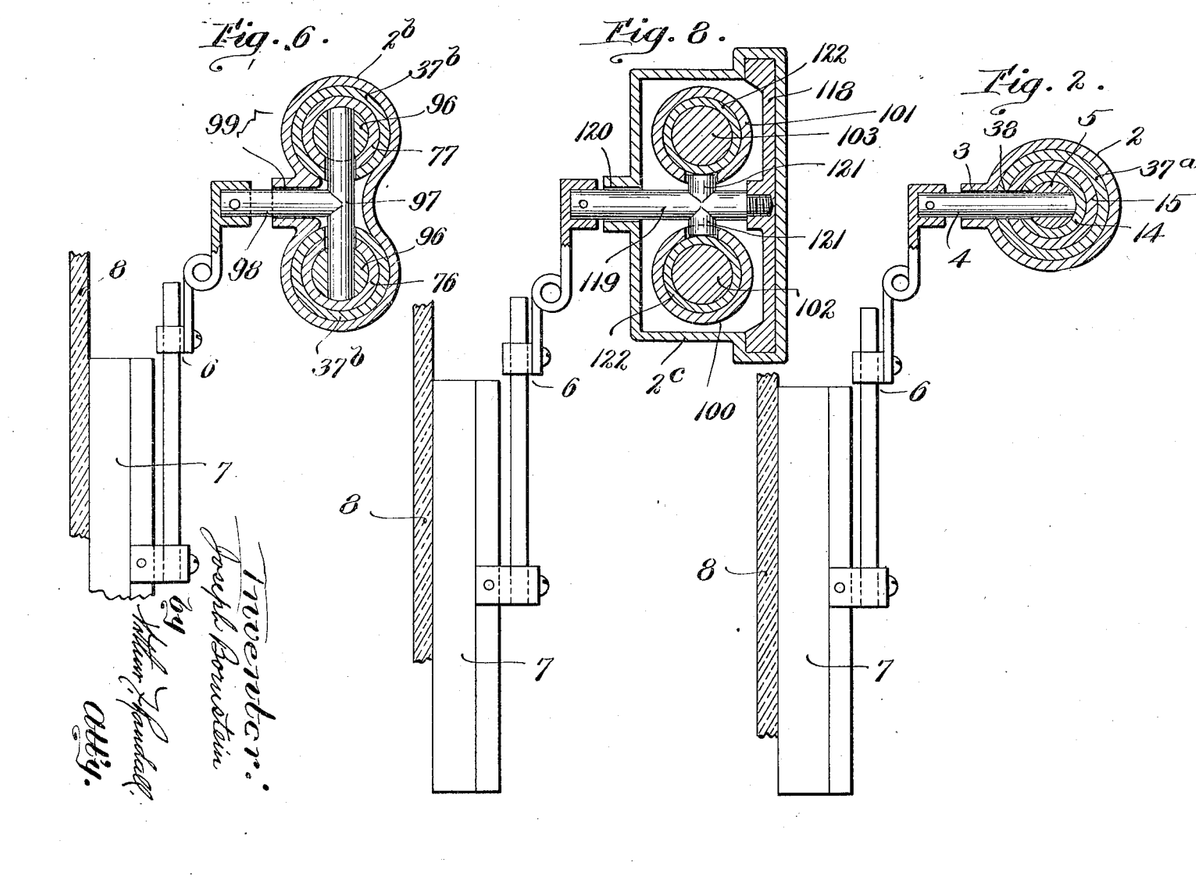
Figure 2 is a section on line 2—2 of Figure 1.
Figure 6 is a section on line 6—6 of Figure 5.
Figure 8 is a section on line 8—8 of Figure 7.

The wiper mechanism illustrated in Figs. 1 and 2 comprises a frame consisting of a box-like housing section 1 to which is rigidly connected one end of a tubular section 2 provided upon its rear side with a longitudinal slot 3, Fig. 2, within which travels a stud or extension 4 forming part of a wiper carriage 5. To the outer end of the stud 4 is fastened the upper end of the stem 6 of a wiper element 7; said stem 6 being constructed as usual so as to yieldingly press the wiper element 7 against the glass 8 of a windshield.

At its outer end the tubular section 2 of the frame is made with an ear 9, Fig. 1, fastened by screws 10 to the frame 11 of the windshield; while, at the opposite end of the frame 1—2 the box-like housing section 1 is provided upon its outer side with an ear 12 that is also fastened by screws 13 to the frame of the windshield. The mechanism is secured in position upon the windshield frame 11 adjacent the top of the glass 8 thereof, and the wiper element extends downwardly from the tubular section 2 as shown.

The body 5 of the wiper carriage is a cylindrical block of metal slidably mounted within a tubular worm shaft 14 rotatably mounted within another tubular worm shaft 15. The tubular frame section 2 is made at one end with a head or end wall 16 which serves to prevent endwise movement of the worm shaft 14 in one direction, while the opposite end portion of the worm shaft 14 projects into the housing section 1 where it is provided with a collar 17 in abutting engagement with a cross-bar 18 forming part of the housing section 1. This end of the worm shaft 14 is journaled in a bearing provided in the cross-bar 18.

The outer worm shaft 15 is journaled near its opposite ends in bearing sleeves 19 fixed in position within the tubular frame section 2, and endwise movement of said outer worm shaft in one direction is prevented by its engagement with the wall 16 of the frame, while endwise movement thereof in the opposite direction is prevented by a collar 20 fast on said outer worm shaft and having abutting engagement with the bearing sleeve or bushing 19 adjacent said other end.

The outer worm shaft 15 also projects at one end into the housing section 1 and is provided with a collar 21 constructed with axially or longitudinally extending pins or studs 22 to co-operate with one or more pins or studs 23 provided upon the adjacent face of a gear 24 that is loosely mounted upon the worm shaft 14. The opposite side face of the gear 24 is provided with one or more axially or longitudinally extending pins or studs 25 to co-operate with one or more pins or studs 26 projecting from the adjacent face of the collar 17 on the inner worm shaft 14. All of the the pins or studs just referred to are positioned the same radial distance from the axis of the inner worm shaft 14.

The gear 24 is made upon its periphery with an annular groove 27 occupied by the flange of a cam 28 fixed to a shaft 29 journaled in bearings on the housing section 1. This shaft 29 carries a worm wheel 30 driven by a worm 31 fastened upon one end of another shaft 32 also journaled in bearings on housing section 1.

At its opposite end the shaft 32 carries a spiral gear 33 that is driven by another spiral gear 34 fast on a continuously driven main drive shaft 36. This main drive shaft 36 also has fast on it, a wide gear 37 that meshes with and continuously drives the gear 24 above referred to. It will also be clear that the cam 28 is continuously rotated through the connections described by the main drive shaft 36.

Cam 28 is constructed to impart one complete reciprocation to the gear 24 during each revolution thereof, that is, during each half revolution of cam 28 it shifts the gear 24 to the limit of its movement in one direction and during the other half revolution of said cam it shifts the gear 24 back to the limit of its movement in the opposite direction, but each movement of gear 24 is effected by less than one-half of the revolution of cam 28 so that said gear 24 dwells for a period of time at the limit of its movement in each direction.

The stud 4 of the wiper carriage 5 extends through the slots of both tubular worm shafts 14 and 15 so that if either one of those two worm shafts is left free and power is applied to the other to rotate it, the latter worm shaft will operate to shift the wiper carriage 5 longitudinally in one direction with respect to the two worm shafts and during this movement of the wiper carriage the stud 4 will idly rotate the other worm shaft which is left free, as described. Thus by alternately applying power to the worm shafts 14 and 15, the wiper carriage is reciprocated back and forth across the windshield.

The gear 24 is continuously driven by the gear 27 and is automatically shifted and controlled by the cam 28 so as to alternately engage the pins 22 and 26 of the worm shafts 14 and 15, the connections above described between shafts 36 and 29 being such as to rotate the cam 28 one-half of a revolution for each traverse of the wiper element.

In this way the wiper carriage 5 is slidably supported by the inner worm shaft 14 while power is alternately applied to the two worm shafts to reciprocate said carriage.

It will be observed that the continuously rotating gear 24 is positively controlled at all times and there is no possibility for it to dwell or lag in an intermediate, neutral or "dead center", position as in some of the carriage-operating and controlling mechanisms heretofore provided. Furthermore no springs are required either in the operation or control of the shiftable driving member 24, herein shown as a gear.

Since the driving gear 37 continuously rotates the shiftable clutch-gear member 24 in one direction, the worm shaft 14 is made with a right hand spiral slot, while the worm shaft 15 is made with a left hand spiral slot. Thus, although both worm shafts are driven in the same direction but alternately as described, one operates to shift the wiper carriage longitudinally in one direction and the other in the opposite direction.

In the above described form of my invention the two telescopically arranged worm shafts are in contact and therefore they function to mutually support each other against vibratory or whipping motion and also against sagging intermediate their ends. Nevertheless, I may provide small isolated bearing bushings 37a at separated intervals throughout the length of the outer worm shaft 15, said bushings being secured in position within the tubular frame section 1. Each isolated bearing 37a is formed with a longitudinal slot 38, Fig. 2, through which the stud or carriage extension 4 is free to pass as the carriage is reciprocated.

The main drive shaft 36 of the mechanism may be driven by an electric motor, by a spring motor such as hereinafter described, or in any other suitable fashion.

Figure 3:
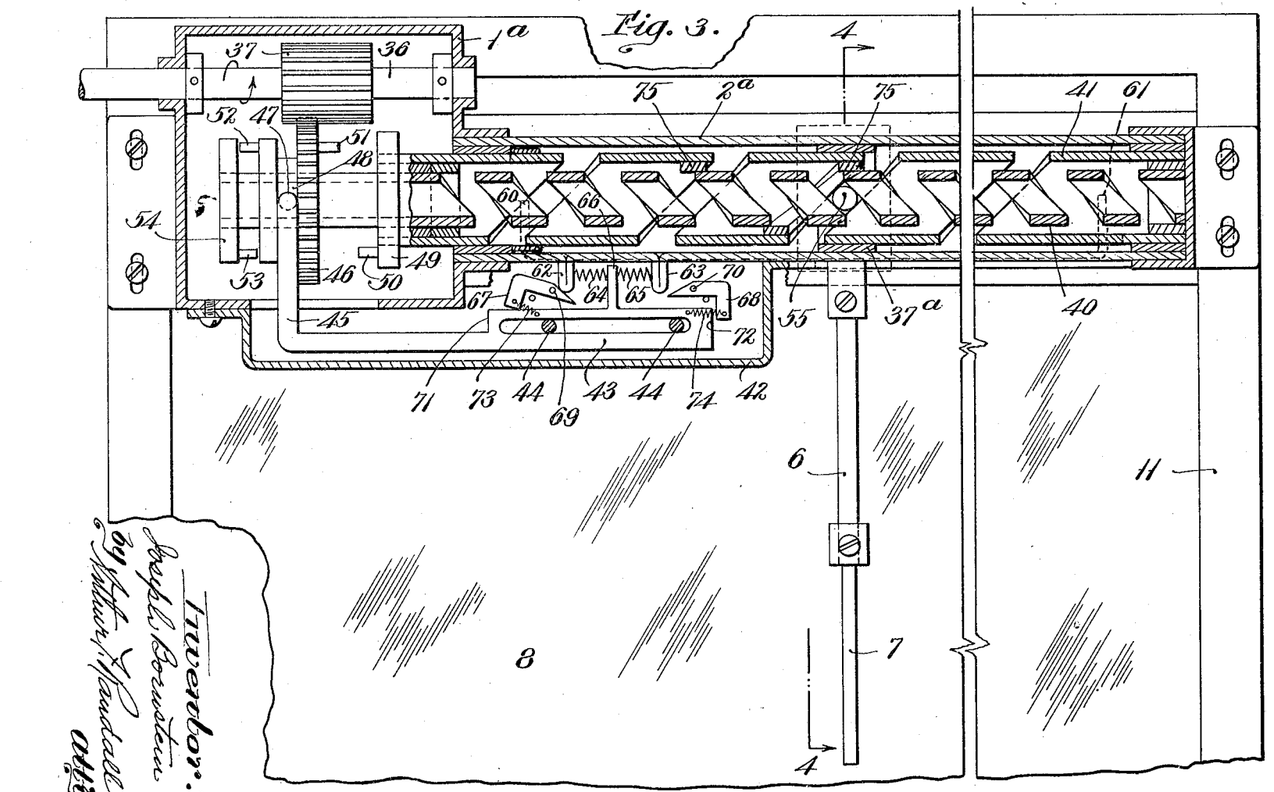
Figure 3 is a partial front elevation of a windshield equipped with a wiper mechanism embodying a second form of my invention.
Figures 4, 10, 11:
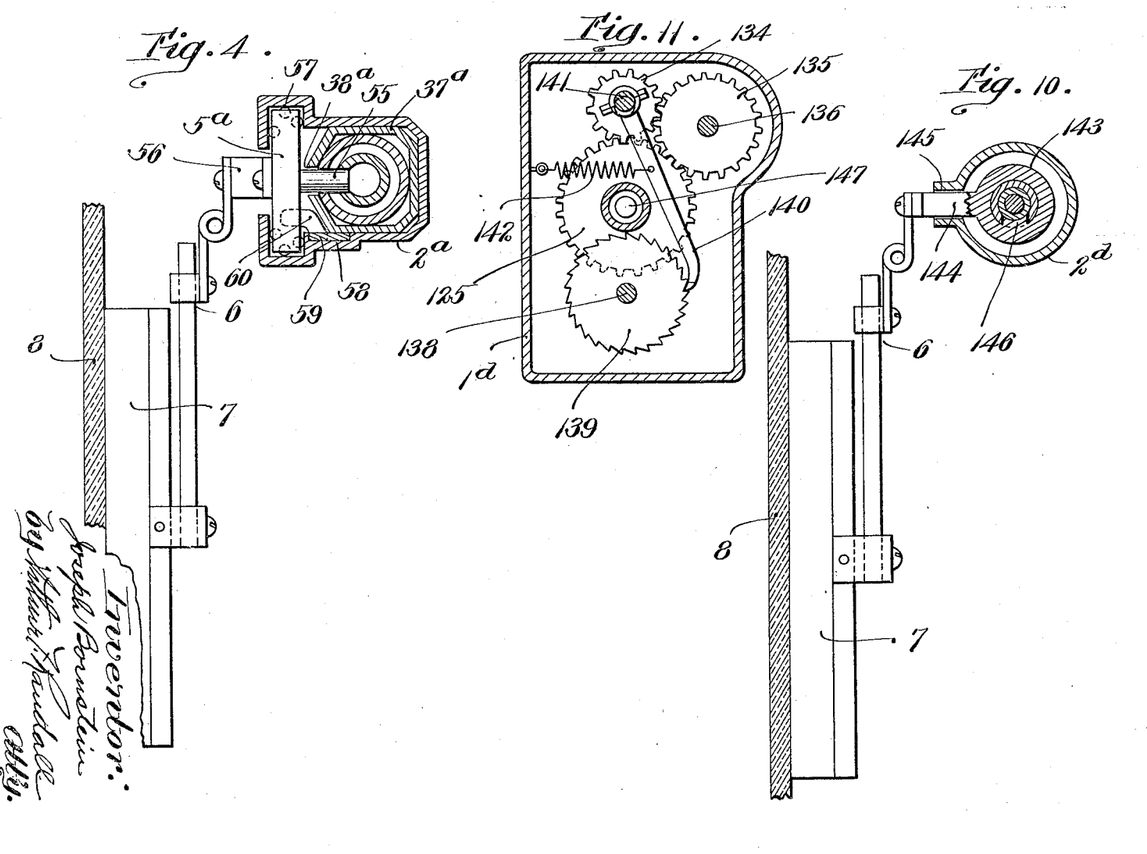
Figure 4 is a section on line 4—4 of Figure 3.
Figure 10 is a section on line 10—10 of Figure 9.
Figure 11 is a section on line 11—11 of Figure 9.

The form of my invention illustrated in Figs. 3 and 4, includes a worm shaft 40 occupying a position within a second worm shaft 41.

The frame of this mechanism is constructed substantially the same as that described in connection with Figs. 1 and 2 except that a housing extension or annex 42 is provided within which is arranged a shipper member 43 slidably mounted upon cross-bars 44 forming part of said extension or annex. At one end the shipper member 43 is made with a laterally and upwardly extending arm 45 formed at its upper end with a yoke embracing the hub portion of a worm-shaft driving member 46, the extremities of said yoke having trunnions, one of which is shown at 47, occupying an annular groove 48 provided in the hub of member 46.

One end portion of the outer worm shaft 41 occupies a position within the housing section 1a of the frame and is provided with a head or flange 49 carrying one or more pins 50 to co-operate with one or more pins 51 provided upon the adjacent face of the drive member 46. The opposite face of drive member 46 is provided with one or more pins or studs 52 to co-operate with one or more pins or studs 53 provided upon a flange 54 that is part of the inner worm shaft 40.

The drive member 46 is continuously in mesh with a wide gear 37 fast on the continuously driven main drive shaft 36 of this mechanism.

As shown in Fig. 4 the wiper carriage of this mechanism includes a rectangular body 5a provided with a stud 55 that projects inwardly through both worm shafts. Upon its outer side the wiper carriage 5a is provided with an extension 56 to which the upper end of the stem 6 of the wiper element 7 is secured.

Upon its exterior wiper carriage body 5a is made with hemispherical sockets occupied by anti-friction balls 57 bearing against walls provided upon the interior of the tubular section 2a of the frame of the mechanism.

Within the tubular section 2a of the frame is provided a longitudinal groove 58 occupied by a slide-bar 59 provided at its opposite ends with upwardly projecting arms 60 and 61 disposed in the path of the wiper carriage body 5a so that when said wiper carriage, traveling in either direction nears the limit of its movement in that direction, it will engage one of these arms and positively shift the slide-bar 59 endwise in the same direction in which the carriage is traveling.

Adjacent the housing frame section 1a the slide-bar 59 is made with a pair of depending lugs 62 and 63 occupying a slot, not shown, formed through the bottom wall of the groove 58 with provision for longitudinal movement therein. Two alined springs 64 and 65 have their outer ends abutting each against one of the lugs 62, or 63, while their inner ends abut against the opposite sides of a lug 66 projecting upwardly from the shipper member 43.

Within the housing extension or annex 42 are two latch members 67 and 68 pivoted, respectively, at 69 and 70 on the frame of the mechanism. The latch 67 has one arm thereof made with a laterally and downwardly extending end portion, or arm, to co-operate with a shoulder 71 provided on shipper member 43, while the latch 68 is similarly constructed to co-operate with a shoulder 72 on said shipper member.

Springs 73 and 74 yieldingly urge the latches toward shoulder-engaging positions.

The other arm of each latch 67 and 68 is made with an inclined or beveled end to co-operate with the adjacent lug 62 or 63.

With the parts occupying the positions shown in Fig. 3, gear 46 is rotating the inner worm shaft 40, which is made with a left hand slot, in a direction to propel the wiper carriage 5a toward the right and as said carriage nears the limit of its movement in this direction it engages the arm 61 of slide-bar 59 thereby moving the latter endwise, toward the right, in Fig. 3, compressing spring 64 while the latch 68 holds the shipper 43 against movement toward the right until the lug 63 engages and lifts said latch 68, whereupon the compressed spring 64 acts through the lug 66 to throw the shipper 43 to the limit of its movement toward the right.

When this occurs the driving member 46 is disengaged from the inner worm shaft 40 and engaged with the outer worm shaft 41 to which rotation in a right hand direction is then imparted. This rotation of the outer worm shaft 41 propels the wiper carriage toward the left, Fig. 3, until said wiper carriage nears the limit of its movement in that direction whereupon it engages the arm 60 of slide-bar 59 and shifts the latter toward the left. This movement of the slide-bar toward the left acts to first compress the spring 65 and thereafter to trip the latch 67 so as to allow the compressed spring 65 to act through lug 66 to shift shipper 43 toward the left, Fig. 3, back to its original position, thereby disconnecting the driving member 46 from the outer worm shaft 41 and again connecting it with the inner worm shaft 40.

It will be understood that when the latch 68 is tripped and shipper 43 is shifted by spring 64 toward the right, the latch 67 drops into position to co-operate as an abutment with the shoulder 71 on said shipper, while the latch 68 will drop into position to co-operate as an abutment with the shoulder 72 when the shipper 43 is shifted toward the left by spring 65 as described.

In this form of my invention shown in Figs. 3 and 4 the two worm shafts are not in engagement throughout their lengths so that, I may provide spiral filler bearing strips 75 upon the interior of the outer worm shaft 41 at separated intervals along its length which serve to maintain the convolutions of the two worm shafts in properly spaced apart relationship, and as means through which they act to mutually support each other.

I may also provide isolated bearing sleeves or bushings 37a within the housing section 2a at intervals throughout the length of the outer worm shaft 41. These isolated bearings 37a are formed with longitudinal slots 38a, Fig. 4, for the passage of the stud 55 and they may be fastened in position within the tubular frame section 2a in any suitable fashion.

The spiral spacer strips 75 are preferably soldered or otherwise secured to the interior of the outer worm shaft 41 and are parallel with the slot of the latter.

It will thus be observed that the driving member 24 of Fig. 1 is operated and controlled wholly independently of the movements of the wiper carriage of that mechanism, while in Fig. 3 the driving member 46 is controlled and operated by the movement of the wiper carriage, but in such manner that it cannot dwell in an intermediate idle position.

Figure 5:
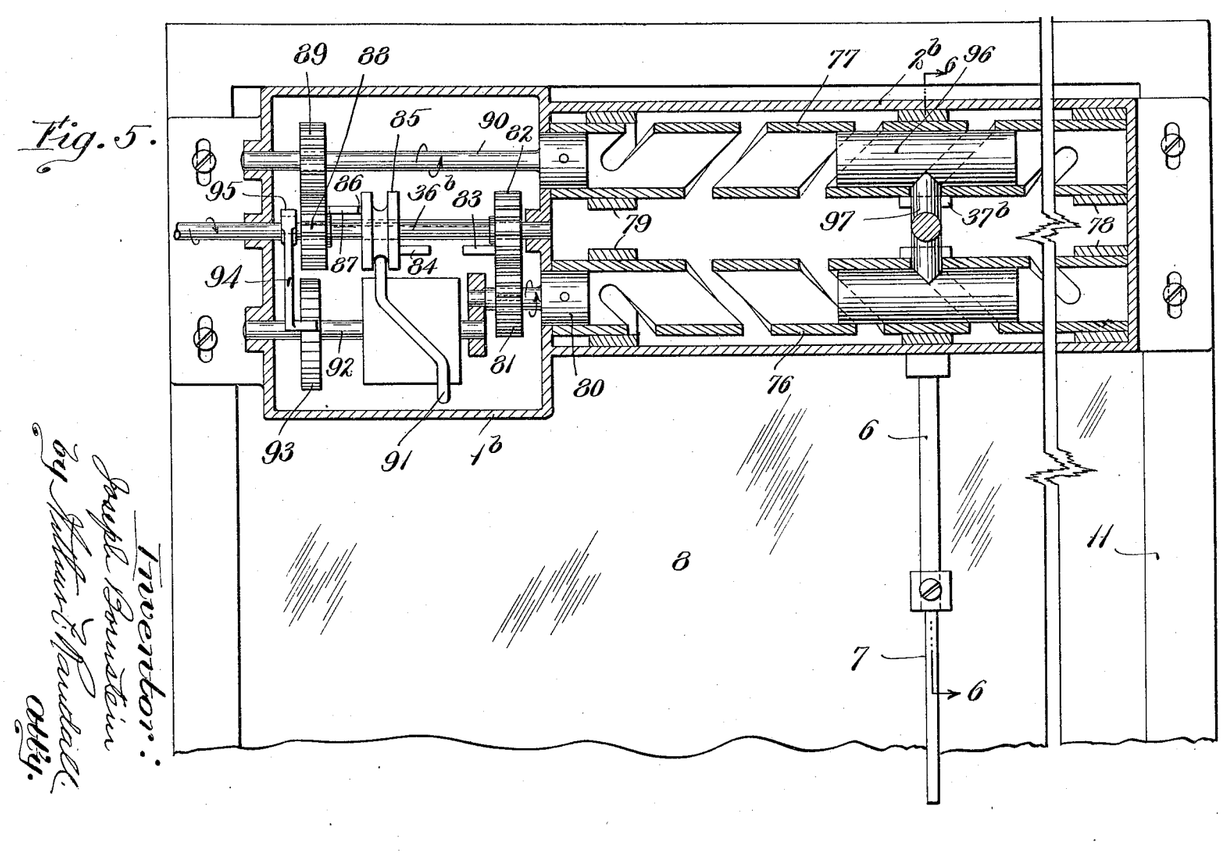
Figure 5 is a partial front elevation of a windshield equipped with a wiper mechanism embodying a third form of my invention.

Like the two forms of my invention above described, the form illustrated in Figs. 5 and 6, includes a pair of tubular worm shafts 76 and 77, and while the shafts of the first two forms are arranged telescopically one within the other, in Figs. 5 and 6, they are arranged side by side although they are alternately operated to reciprocate the wiper carriage as before by means constructed and operating upon the same general principle as that shown in Fig. 1.

As shown in Fig. 5, the two tubular worm shafts 76 and 77 are rotatably supported at intervals throughout their lengths by isolated bearings 78 and 37b secured in position within the tubular frame section 2b, the intermediate bearing, or bearings, 37b being slotted for the passage of the wiper carriage.

To one end of the worm shaft 76 is fastened a shaft extension 80 that projects into the housing section 1b of the frame and carries a gear 81 in mesh with a gear 82 loosely mounted upon the main drive shaft 36b of the mechanism. Projecting from one side of gear 82 is a stud or pin 83 to co-operate with a stud or pin 84 projecting from the adjacent side of a worm-shaft-driving clutch member 85 splined on the main drive shaft 36b.

The opposite side or face of the clutch member 85 is provided with a pin or stud 86 to co-operate with a pin or stud 87 projecting from the adjacent side or face of a gear 88 that is also loosely mounted on the main drive shaft 36b. This gear 88 is in mesh with a gear 89 fast on a shaft extension 90 connected with the other worm shaft 77.

The clutch member 85 is provided upon its exterior with a circumferential groove that is occupied by the flange of a cam 91 fast on a countershaft 92 journaled in bearings on the frame of the mechanism. This countershaft 92 has a ratchet wheel 93 fixed thereon that is engaged by the free end of a pawl 94 whose opposite end is made with a bearing within which is an eccentric 95 forming part of the main drive shaft 36b.

The main drive shaft 36b is, as before, continuously driven from any suitable source of power and operates through the eccentric 95 and pawl 94 to rotate ratchet wheel 93, shaft 92 and cam 91 step-by-step thereby to cause the latter to move the clutch member 85 back and forth on main drive shaft 36b so that it is alternately engaged with the gears 82 and 88 which are loose on said main drive shaft.

When the parts occupy the positions illustrated in Fig. 5, the driving clutch member 85, which is continuously driven in the direction indicated by the arrow, acts through gear 88, gear 89 and shaft extension 90 to rotate the worm shaft 77 in the direction indicated by the arrow thereon. When the cam 91 moves the driving clutch member over into clutching engagement with gear 82 said member acts through the latter, gear 81 and shaft extension 80, to rotate worm shaft 76 in the direction indicated by the arrow applied to shaft extension 80.

The wiper carriage of the form of my invention shown in Fig. 5 comprises a pair of cylindrical blocks 96, one mounted within worm shaft 76 and the other within worm shaft 77, and these two blocks 96 are connected by a tie-bar 97 formed with a stud extension 98 projecting through a longitudinal slot 99 provided in the tubular section 2b of the frame of the mechanism. To the outer end of this stud extension 98 is fastened the upper end of the stem 6 of the wiper element 7.

The worm shaft 76 is made with a left hand spiral slot while the worm shaft 77 is made with a right hand spiral slot and the tie-bar 97 of the wiper carriage extends through both of these slots. It will therefore be clear that when member 85 is in clutching engagement with gear 82 the worm shaft 76 is driven in a direction to propel the wiper carriage toward the left in Fig. 5, the engagement of the tie-bar 97 with the slot of worm shaft 77 idly rotating the latter in a direction opposite to that indicated by the arrow applied to its shaft extension 90.

So also when the clutch member 85 is in engagement with the gear 88, it operates to rotate the worm shaft 77 in a direction to propel the wiper carriage toward the right in Fig. 5, the tie-bar 97 acting during this movement to idly rotate the worm shaft 76 in a direction opposite to the arrow applied to its shaft extension 80.

It will also be observed that in both Fig. 1 and Fig. 5 the wiper carriage is supported by a pair of tubular worm shafts and that these two shafts are alternately driven to reciprocate the wiper carriage by means wholly independent of the latter except that the drive for the wiper carriage is shifted from one worm shaft to the other at the end of each stroke of said wiper carriage.

Figure 7:
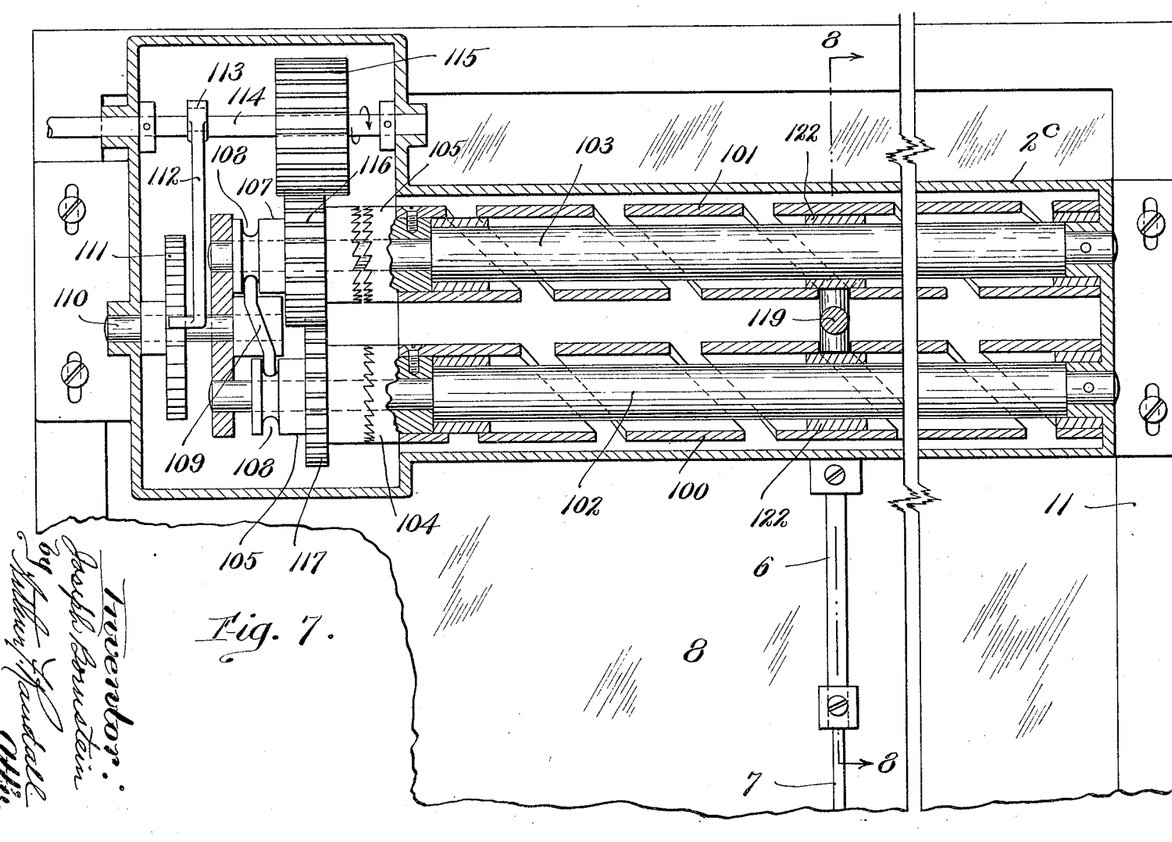
Figure 7 is a partial front elevation of a windshield equipped with a fourth form of my invention.

In the form of my invention illustrated in Figs. 7 and 8, two worm shafts 100 and 101 are provided which are rotatably supported by two fixed arbors 102 and 103 forming part of the frame of the mechanism.

The worm shaft 100 is made at one end with a clutch member 104 to co-operate with a continuously driven shiftable clutch member 105 loosely mounted on the arbor 102. The worm shaft 101 is also made with a clutch member 106 co-operating with a continuously driven clutch member 107 loosely mounted on the arbor 103.

The clutch members 105 and 107 have hub portions formed with circumferential grooves 108 into which the flange of a cam 109 projects. This cam 109 is fast on a short shaft 110 journalled in bearings on the frame of the mechanism and provided with a ratchet wheel 111 engaged by the free end of a pawl 112 whose opposite end is mounted upon an eccentric or crank 113 provided on a continuously driven main drive shaft 114.

Fixed on the main drive shart 114 is a wide gear 115 driving a gear 116 that is part of the clutch member 107, and this latter gear 116 drives a gear 117 that is part of the other clutch member 105.

The main shaft 114 is continuously driven in one direction from any suitable source of power, as for example by an electric motor, and operates through the eccentric or crank 113 and pawl 112 to continuously rotate the cam 109 step-by-step in one direction while it acts through the gear 115 to continuously drive the two clutch members 105 and 107 in opposite directions.

During each half revolution of the cam 109 it acts to slide the clutch members in opposite directions on the arbors 102 and 103 so as to place one of said clutch members in an operative position and the other in an idle position, said clutch members alternately occupying operative positions each with respect to its complementary clutch member on its worm shaft. Thus the two worm shafts 100 and 101 are alternately rotated. That is, each rotates for a period of time and then rests for a period of time while the other is being rotated.

In this form of my invention the wiper carriage includes a body member 118 slidably mounted in longitudinal ways provided within the tubular section 2c of the frame of the mechanism. To the middle of the slide 118 is secured one end of a stud 119 which extends from the slide laterally between the two worm shafts and through a slot 120 provided in a frame section 2c to the exterior of the latter where it has the upper end of the stem 6 of the wiper element 7 secured to it. Lugs or studs 121 projecting from opposite sides of the stud 119 occupy the slots of the two worm shafts 100 to 101. It will therefore be clear that when the worm shaft 100 is being driven the wiper carriage will be propelled thereby toward the right, Fig. 7, through its engagement with one of the lugs 121 while the other worm shaft is idly rotated by the opposite lug 121. Also, when worm shaft 101 is being driven it operates through one of the lugs 121 to propel the wiper carriage toward the left, Fig. 7, while the other lug 121 idly rotates the worm shaft 100.

As shown in Fig. 7 the intermediate gear 116 is made wider than the gear 117 so that the reciprocatory movements of the clutch members on the arbors 102 and 103 does not demesh said gears. Also, the main drive gear 115 is made wider than the gear 116 so that reciprocatory movement of clutch member 107 does not demesh said two gears.

Each worm shaft may be supported at separated intervals throughout its length by isolated bearings in the form of sleeves 122 which may be secured in place each within its worm shaft. Or each of these bearing sleeves may be secured in position upon the arbor which it surrounds so that its worm shaft turns relatively thereto.

Each form of my invention above described includes a pair of worm shafts arranged either one within the other or side by side, the shafts of each pair being alternately rotated to reciprocate the wiper carriage and the latter having permanent driving connections with both of said shafts.

Figure 9:
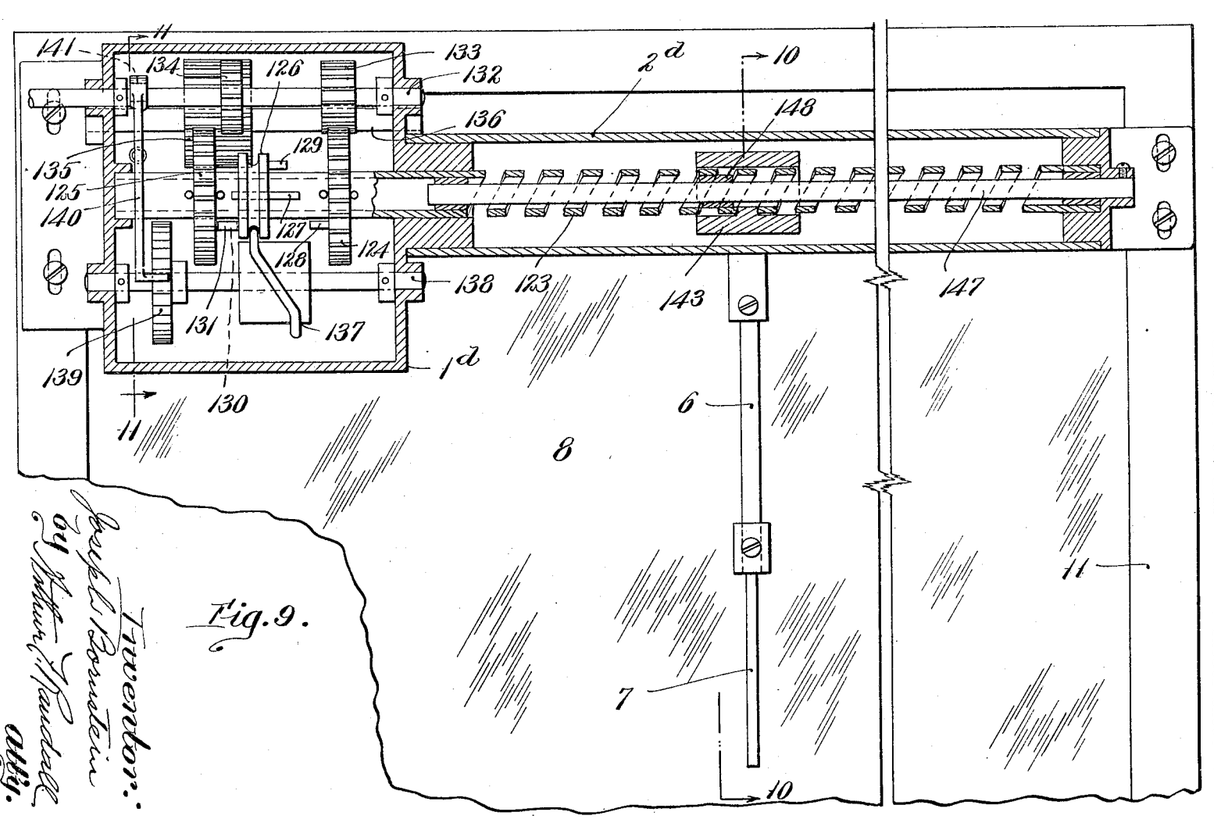
Figure 9 is a partial front elevation of a windshield equipped with a fifth form of my invention.

In Figs. 9, 10 and 11 is illustrated a form of my invention which includes a single worm shaft 123 journaled in bearings on the frame of the mechanism, said frame including a tubular frame section 2d within which the greater portion of said worm shaft is arranged, and a housing frame section 1d into which said worm shaft is extended.

Loosely mounted upon the worm shaft 123 within the housing 1d are two gears 124 and 125 between which is provided a driving clutch member 126 slidably mounted on worm shaft 123 but connected thereto by means of a key or spline 127.

Upon one face the gear 124 is provided with a longitudinally projecting pin or stud 128 to co-operate with a pin or stud 129 projecting longitudinally from the adjacent side of clutch member 126. Upon its opposite side the clutch member 126 is provided at 130 with a pin or stud to co-operate with a pin or stud 131 projecting from the adjacent side of the gear 125. It will thus be clear that by shifting clutch member 126 longitudinally on worm shaft 123 a driving connection can be established between either gear 124 or 125 and said worm shaft.

The gear 124 is continuously and directly driven from the main drive shaft 132 by a gear 133 fast on the latter, while the gear 125 is driven in the opposite direction by a gear 134 on main drive shaft 132 acting through an intermediate gear 135 that is in mesh with the gear 125. The intermediate gear 135 is fast on a shaft 136 journaled in bearings on the frame of the mechanism.

The clutch member 126 is provided upon its exterior with a circumferential groove that is occupied by the flange of a cam 137 fast on a countershaft 138. This countershaft carries a ratchet wheel 139 engaged by the free end of a pawl 140, Figs. 9 and 11, whose opposite end is engaged with an eccentric or crank 141 forming part of the main drive shaft 132. A spring 142 serves to hold the free end of the pawl 140 in engagement with ratchet wheel 139.

Thus, as with the forms of my invention heretofore described, the clutch-operating cam 137 is continuously rotated step-by-step in one direction by pawl 140 and operates to engage the clutch member 126 alternately with the gears 124 and 125 which are traveling in opposite directions. It will therefore be clear that the worm shaft 123 is alternately rotated in opposite directions by means wholly independent of the wiper carriage.

In this form of my invention the wiper carriage includes a tubular body portion 143, Figs. 9 and 10, provided upon one side thereof with an extension 144 projecting through the slot 145 of the tubular frame section 2d to the exterior of the latter where it has fixed to it the upper end of the stem 6 of a wiper element 7. Within the tubular body portion 143 is provided a lug or stud 146 occupying the slot of the worm shaft 123.

It will therefore be clear that the wiper carriage is reciprocated to move the wiper element 7 back and forth across the windshield by the single worm shaft 123 which is driven alternately in opposite directions by means operating, as just pointed out, wholly independently of the wiper carriage.

If desired the worm shaft 123 may be interiorly supported at separated intervals throughout its length by isolated bearings, such as those already described, in connection with Fig. 7, fixed in position upon an arbor 147 fastened at one end to the frame of the mechanism. The opposite end of this arbor 147 is loosely mounted within and supported by the unslotted portion of the worm shaft adjacent the housing section 1d.

Each of the above described constructions provides a compact and efficient wiper mechanism for windshields and the like which is of simple and inexpensive construction and which is devoid of parts such as are liable to wear loose or stretch and produce objectionable noises. Also, each above described worm shaft is of light tubular construction and supported by one or more isolated bearings so as to be held against flexing or "whipping" while in operation.

What I claim is:

1. In a wiper mechanism of the class described, in combination, a worm shaft; a carriage; means connecting said carriage with said worm shaft through which the latter operates said carriage, and means for intermittently rotating said worm shaft independently of the movements imparted thereby to said carriage.

2. In a wiper mechanism of the class described, in combination, two worm shafts; a carriage; means connecting said carriage with said worm shafts through which the latter operate said carriage, and means for alternately rotating said worm shafts.

3. In a wiper mechanism of the class described, in combination, two worm shafts; a carriage; means permanently connecting said carriage with said worm shafts through which the latter operate said carriage and means for alternately rotating said worm shafts.

4. In a wiper mechanism of the class described, in combination, two worm shafts; a carriage; means permanently connecting said carriage with said worm shafts through which the latter operate said carriage, and means for alternately rotating said worm shafts independently of the movements imparted thereby to said carriage so as to reciprocate the latter.

5. In a wiper mechanism of the class described, in combination, a worm shaft constructed with a clutch member; a carriage; means permanently connecting said carriage with said worm shaft through which the latter operates said carriage, and positively operable means including an adjustable clutch member co-operating with the clutch member of the worm shaft for intermittently rotating said worm shaft.

6. In a wiper mechanism of the class described, in combination, a worm shaft; a driven clutch member associated with said worm shaft; a carriage; means permanently connecting said carriage with said worm shaft through which the latter operates said carriage, and means including an automatically shifted driving clutch member for intermittently rotating said worm shaft independently of the movements imparted thereby to the carriage.

7. In a wiper mechanism of the class described, in combination, two worm shafts; two clutch members, each associated with one of said shafts; a carriage; means permanently connecting said carriage with said worm shafts through which the latter operate said carriage, and means including an automatically shifted driving clutch member co-operating with said two first-mentioned clutch members to alternately rotate said worm shafts thereby to reciprocate said carriage.

8. In a wiper mechanism of the class described, in combination, two worm shafts; two clutch members, each associated with one of said shafts; a carriage; means permanently connecting said carriage with said worm shafts through which the latter operate said carriage, and means including an automatically shifted driving clutch member co-operating with said two first-mentioned clutch members to alternately rotate said worm shafts thereby to reciprocate said carriage independently of the movements imparted thereby to said carriage.

9. In a wiper mechanism of the class described, in combination, two worm shafts; two clutch members, each associated with one of said shafts; a carriage; means permanently connecting said carriage with said worm shafts through which the latter operate said carriage; a continuously rotated adjustable driving clutch member co-operating with said two first-mentioned clutch members to alternately rotate said worm shafts thereby to reciprocate said carriage, and means for automatically shifting said rotating driving clutch member to cause the same to alternately engage said two first-mentioned clutch members.

10. In a wiper mechanism of the class described, in combination, two worm shafts; two clutch members, each associated with one of said shafts; a carriage; means permanently connecting said carriage with said worm shafts through which the latter operate said carriage; a shiftable driving clutch member between and co-operating with said two first-mentioned clutch members; a main drive shaft that is continuously rotated in one direction and by which said shiftable clutch member is continuously rotated, and means operated by said continuously rotating main drive shaft for shifting said continuously driven clutch member so as to cause it to alternately engage said two first-mentioned clutch members.

11. In a wiper mechanism of the class described constructed in accordance with claim 10 and wherein the means for shifting said continuously rotating driving clutch member consists of a cam that is operated by said continuously rotating main drive shaft.

12. In a wiper mechanism of the class described constructed in accordance with claim 10 and wherein the means for shifting said continuously rotating driving clutch member includes a rotatable cam and a connection between said cam and said main drive shaft through which the latter rotates said cam at a slower speed than said main drive shaft.

13. In a wiper mechanism of the class described, in combination, a tubular worm shaft in the form of a spirally coiled band; a carriage slidably mounted within said tubular worm shaft and supported by the latter; means projecting from said carriage through the spiral slot of said worm shaft through which the latter operates said carriage, and means for intermittently rotating said worm shaft.

14. In a wiper mechanism of the class described, in combination, two tubular worm shafts each consisting of a spirally formed band having its convolutions spaced apart to provide a spiral slot; a carriage slidably supported and actuated by said worm shafts; and means for alternately driving said worm shafts thereby to reciprocate said carriage.

15. In a wiper mechanism of the class described, in combination, two worm shafts one of which is disposed within the other and each of which is formed with a spiral slot; a carriage including means occupying the slots of both worm shafts through which the latter operate said carriage, and means for alternately driving said worm shafts thereby to reciprocate said carriage.

16. In a wiper mechanism of the class described, in combination, two worm shafts one of which is disposed within the other and each of which is formed with a spiral slot; a carriage including means occupying the slots of both worm shafts through which the latter operate said carriage; two clutch members each associated with one of said worm shafts; a continuously rotated shiftable clutch member, and automatic means for shifting said clutch member to cause it to alternately engage and drive the said two first-mentioned clutch members thereby to alternately drive said worm shafts to cause the same to reciprocate said carriage.

17. In a wiper mechanism of the class described, in combination, a frame; two worm shafts rotatably supported adjacent their ends on said frame, one of said shafts being disposed within the other and each formed with a spiral slot; a longitudinally slotted isolated bearing supporting the middle portion of each worm shaft; a carriage including means occupying the slots of both worm shafts through which the latter operate said carriage, and means for alternately driving said worm shafts thereby to reciprocate said carriage.

18. The combination of a fixed frame; a worm shaft; a member slidably supported by one of said elements and reciprocated by said worm shaft, said frame being constructed with bearings rotatably supporting said worm shaft including a small isolated bearing engaging the intermediate portion of said worm shaft that is traversed by said slidably supported member to hold said intermediate portion against flexing laterally in any direction without interfering with the movement of said slidably supported member back and forth past said isolated bearing.

19. In a wiper mechanism of the class described, in combination, two worm shafts one of which is disposed within the other; a carriage that is reciprocated by said worm shafts, and means for driving said worm shafts to reciprocate said carriage.

20. In a wiper mechanism of the class described in combination two worm shafts one of which is disposed within the other; a carriage that is reciprocated by said worm shafts, and means for alternately driving said worm shafts thereby to reciprocate said carriage.

Signed by me at Boston, Suffolk County, Massachusetts, this 2nd day of November, 1929.

JOSEPH BORNSTEIN.